(12) United States Patent
Adatrao et al.

(10) Patent No.: US 6,978,139 B2
(45) Date of Patent: Dec. 20, 2005

(54) METHOD AND APPARATUS FOR PERFORMING SOFT-HANDOFF IN A WIRELESS COMMUNICATION SYSTEM

(75) Inventors: Ravi M. Adatrao, West Dundee, IL (US); Jonathan H. Gross, Gilbert, AZ (US); Harn-Jier Lin, Lisle, IL (US); William K. Morgan, Marengo, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/864,831

(22) Filed: Jun. 9, 2004

(65) Prior Publication Data

US 2004/0229619 A1 Nov. 18, 2004

Related U.S. Application Data

(63) Continuation-in-part of application No. 10/439,743, filed on May 16, 2003.

(60) Provisional application No. 60/483,807, filed on Jun. 30, 2003.

(51) Int. Cl.[7] .............................................. H04Q 7/20

(52) U.S. Cl. .................. 455/442; 455/436; 455/422.1; 455/435.1; 455/435.2; 370/328; 370/338

(58) Field of Search ............................... 455/442, 525, 455/435.2, 436–441, 422.1, 435.1; 370/328, 370/338

(56) References Cited

U.S. PATENT DOCUMENTS

| | | | | |
|---|---|---|---|---|
| 5,640,677 A | * | 6/1997 | Karlsson | 455/434 |
| 6,038,448 A | * | 3/2000 | Chheda et al. | 455/436 |
| 6,097,957 A | * | 8/2000 | Bonta et al. | 455/446 |
| 6,104,933 A | * | 8/2000 | Frodigh et al. | 455/522 |
| 6,154,659 A | * | 11/2000 | Jalali et al. | 455/522 |
| 6,160,999 A | * | 12/2000 | Chheda et al. | 455/69 |
| 6,285,874 B1 | * | 9/2001 | Magnusson et al. | 455/456.1 |
| 6,285,883 B1 | * | 9/2001 | Bringby et al. | 455/437 |
| 6,377,563 B1 | * | 4/2002 | Jeon et al. | 370/335 |
| 6,714,785 B1 | * | 3/2004 | Han | 455/440 |
| 2003/0002460 A1 | * | 1/2003 | English | 370/331 |
| 2004/0184423 A1 | * | 9/2004 | Tiedmann et al. | 370/331 |

\* cited by examiner

*Primary Examiner*—Sonny Trinh
*Assistant Examiner*—Khai Nguyen
(74) *Attorney, Agent, or Firm*—Steven A. May

(57) ABSTRACT

When performing a soft-handoff, a communication system determines whether to engage in an analysis of a reverse link associated with a base station under consideration to be added to an active set of a mobile station (MS). Upon determining not to analyze the reverse link, the communication system adds the base station to the active set without evaluating the associated reverse link. Upon determining to engage in a reverse link analysis, the communication system evaluates the reverse link in order to assure that a communication link is not terminated, or dropped, as part of the soft-handoff until such time as the communication system may confirm that an acceptable quality reverse link is being added. The communication system then determines whether to add the base station to the active set based upon the evaluation.

20 Claims, 6 Drawing Sheets

—PRIOR ART—

METHOD AND APPARATUS FOR PERFORMING SOFT-HANDOFF IN A WIRELESS COMMUNICATION SYSTEM

CROSS-REFERENCE TO RELATED APPLICATION

This application is a continuation-in-part of U.S. patent application Ser. No. 10/439,743, filed May 16, 2003, and further claims priority from U.S. provisional application Ser. No. 60/483,807, filed Jun. 30, 2003, which is commonly owned and incorporated herein by reference in its entirety.

FIELD OF THE INVENTION

The present invention relates generally to wireless communication systems and, in particular, to soft-handoffs in a wireless communication system.

BACKGROUND OF THE INVENTION

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of one or more Base Transceiver Stations (BTS's) coupled to one or more Base Station Controllers (BSCs) or Central Base Station Controllers (CBSCs) and forming a Base Station Subsystem (BSS). The BSCs or CBSCs are, in turn, coupled to a Mobile Switching Center (MSC) which provides a connection between the BSS and an external network, such as a Public Switched Telephone Network (PSTN), as well as interconnection to other BSSs. Each BTS provides communication services to a mobile station (MS) located in a coverage area serviced by the BTS via a communication resource that includes a forward link for transmitting signals to, and a reverse link for receiving signals from, the MS.

Fundamental to a wireless communication system is the ability to maintain established communication connections while an MS moves in and between coverage areas. In order to maintain established communication connections, 'soft-handoff' techniques have been developed for code division multiple access (CDMA) communication systems whereby an MS is in concurrent, active communication with multiple BTSs. Each BTS in active communication with the MS is a member of an 'active set' of the MS and transmits bearer traffic to, and receives bearer traffic from, the MS. As the MS moves through the communication system, BTSs are added to, or deleted from, the MS's active set so as to assure that the MS will always be in communication with at least one BTS.

For example, FIG. 1 is block diagram of a CDMA wireless communication system 100 of the prior art. Communication system 100 includes a BSS 104 comprising multiple BTSs 106–108 that are each coupled to a CBSC 110. BSS 104 is coupled to an MSC 114 and MSC 114 is in turn coupled to an external network 116 and provides a communication link between the external network, or other BSSs, and BSS 104. Communication system 100 further includes an MS 102 that concurrently is in active communication with each of BTS 106 and 107. That is, MS 102 is in 'soft-handoff' with each of BTSs 106 and 107 and each of BTS 106 and BTS 107 is a member of an 'active set' of MS 102. As members of the active set of MS 102, each BTS of BTSs 106 and 107 concurrently maintains a respective wireless communication link 120, 130 with the MS. Each communication link 120, 130 includes a respective forward link 122, 132, for conveyance of signals to MS 102 and a respective reverse link 124, 134, for receipt of signals from the MS.

Each BTS 106, 107 in the active set of MS 102 conveys the same bearer traffic to, and receives the same bearer traffic from, the MS. By providing multiple BTSs that concurrently convey same signals to, and receive same signals, from MS 102, communication system 100 enhances the likelihood that the MS will receive an acceptable quality signal from BSS 104 and that the BSS will receive an acceptable quality signal from the MS. For example, when each BTS of BTSs 106 and 107 receives a same frame from MS 102, the BTS determines whether the received frame is acceptable or erroneous and forwards the frame, and an accompanying indicator of whether the frame is acceptable, that is, good, or erroneous, that is, erased, to CBSC 110. CBSC 110, specifically a selection and distribution unit (SDU) 112 included in the CBSC, then selects a version of the received frame from among the versions received from BTSs 106 and 107 and forwards the selected version to MSC 114.

As MS 102 heads towards a coverage area, or sector, associated with BTS 108, a signal strength of a pilot signal received by MS 102 from BTS 108 via a forward link 142 associated with BTS 108 increases until MS 102 identifies the pilot signal from BTS 108 as a viable communication link. In addition, as MS 102 heads away from a coverage area, or sector, associated with BTS 106 a signal strength of a pilot signal received by MS 102 from BTS 106 via forward link 122 may deteriorate to the point that MS 102 determines that communication link 120 is no longer a viable communication link. MS 102 then requests that communication system 100 add BTS 108 to the MS's active set, that is, establish a communication link 140 associated with BTS 108, comprising forward link 142 and a reverse link 144, as an active communication link for transmitting data to, and receiving data from, MS 102, and drop BTS 106 from the active set, that is, terminate communication link 120. Typically, the request to drop a BTS is conveyed by MS 102 via a Pilot Strength Measurement Message (PSMM). Upon receiving the PSMM message, BSS 104 drops BTS 106 from the active set of MS 102 and terminates, or drops, communication link 120 between MS 102 and BTS 106.

A decision to add or drop a communication link 120, 130, 140 and a corresponding BTS 106, 107, 108 from an active set is based on a forward link measurement, that is, a measurement of a signal strength of a pilot signal received by an MS, such as MS 102, via a corresponding forward link. That is, in making an add and/or drop decision, communication system 100 assumes that a performance of a forward link 122, 132, 142 is substantially identical to a performance of a corresponding reverse link 124, 134, and 144. However, a problem arises when there is an imbalance between a performance of a forward link, such as forward links 122, 132, 142, and a performance of a corresponding reverse link, that is, respective reverse links 124, 134, and 144. For example, a sector serviced by a BTS may be subject to interference particular to a reverse link, or propagation paths and fading associated with each of a forward link and a reverse link in a sector may be different due to frequency band separation between the forward and reverse links. As a result, in some cases a communication link with a strong reverse link may be dropped due to a weak forward link while a communication link with a weak reverse link may be added due to a strong forward link. When the reverse link of the dropped communication link, such as reverse link 124 of communication link 120, is the only good reverse link of multiple reverse links, such as reverse links 124 and 134, utilized by an MS while the reverse link of the added communication link, such as reverse link 144 of communication link 140, is of unacceptable quality, then the dropping of the communication link may result in a dropped call.

Thus, a need exists to ensure that a communication link is not terminated, or dropped, as part of a soft-handoff until such time as the communication system may confirm that an acceptable quality reverse link is being added.

DETAILED DESCRIPTION OF THE INVENTION

To address the need for a method and an apparatus that ensures that a first communication link with the only acceptable reverse link is not dropped while a second communication link with an unacceptable reverse link is added during a soft-handoff, a communication system is provided that, when performing the soft-handoff, determines whether to engage in an analysis of a reverse link associated with a base station under consideration to be added to an active set of a mobile station. Upon determining not to analyze the reverse link, the communication system adds the base station to the active set without evaluating the associated reverse link. Upon determining to engage in a reverse link analysis, the communication system evaluates the reverse link in order to assure that a communication link is not terminated, or dropped, as part of the soft-handoff until such time as the communication system may confirm that an acceptable quality reverse link is being added. The communication system then determines whether to add the base station to the active set based upon the evaluation. Upon determining to not add the base station to the active set, the communication system may further monitor the forward links associated with the MS to determine whether to re-consider adding the base station, and the communication links associated with the base station, to the active set.

Generally, an embodiment of the present invention encompasses a method for performing a soft-handoff in a wireless communication system. The method includes receiving a request to add a base station to an active set of a mobile station and determining whether to analyze a reverse link associated with base station. Upon determining not to analyze the reverse link, the method further includes adding the base station to the active set without evaluating the reverse link. Upon determining to analyze the reverse link, the method further includes evaluating the reverse link and, upon evaluating the reverse link, determining whether to add the base station to the active set based upon the evaluation.

Another embodiment of the present invention encompasses an apparatus for performing a soft-handoff in a wireless infrastructure. The apparatus includes a processor that determines whether to analyze a reverse link associated with a base station under consideration to be added to an active set of a mobile station, upon determining not to analyze the reverse link, adds the base station to the active set without evaluating the reverse link, upon determining to analyze the reverse link, evaluates the reverse link, and upon evaluating the reverse link, determines whether to add the base station to the active set base upon the evaluation.

Figure 1:
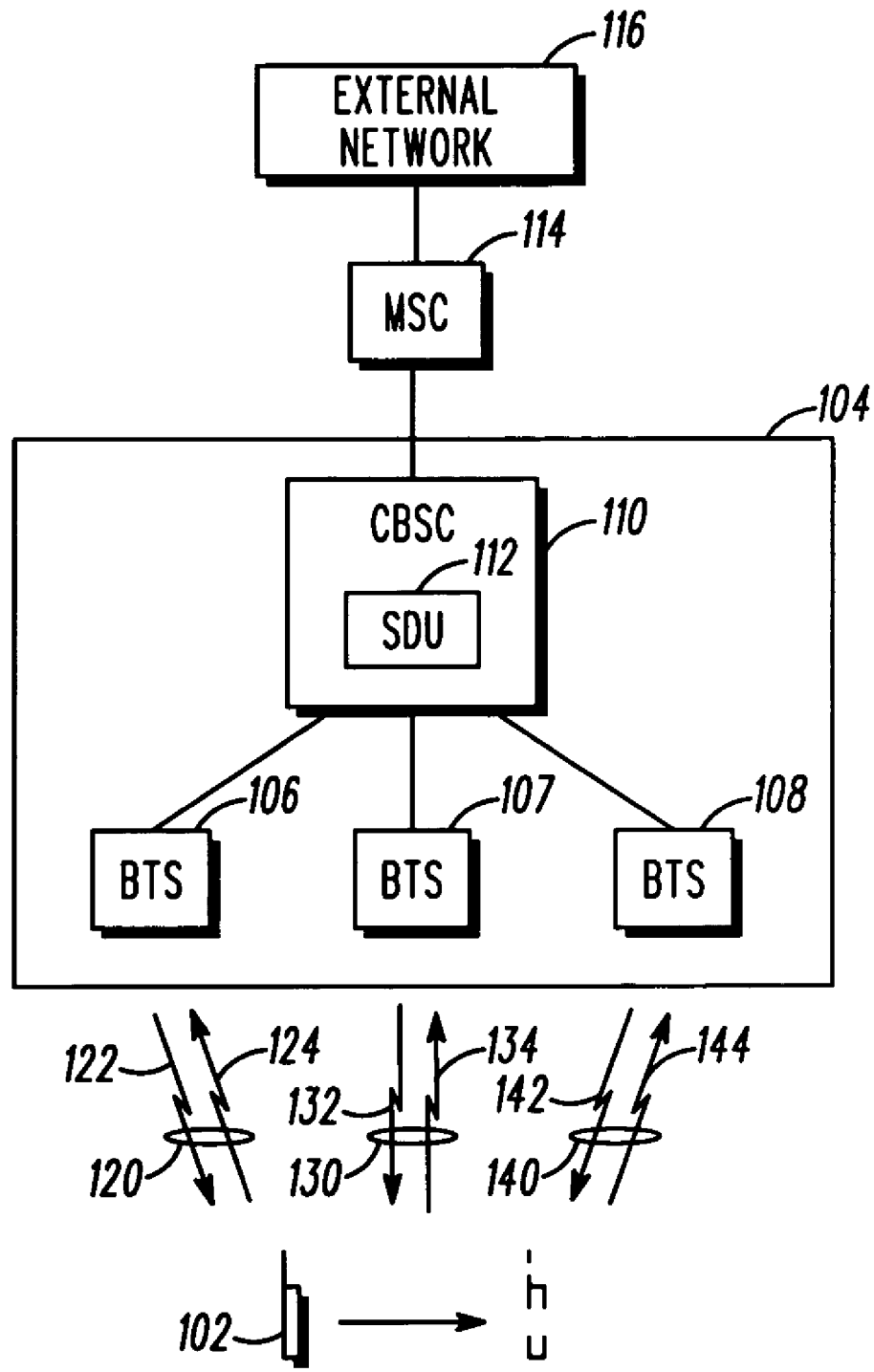
FIG. 1 is a block diagram of a wireless communication system of the prior art.
Figure 2:
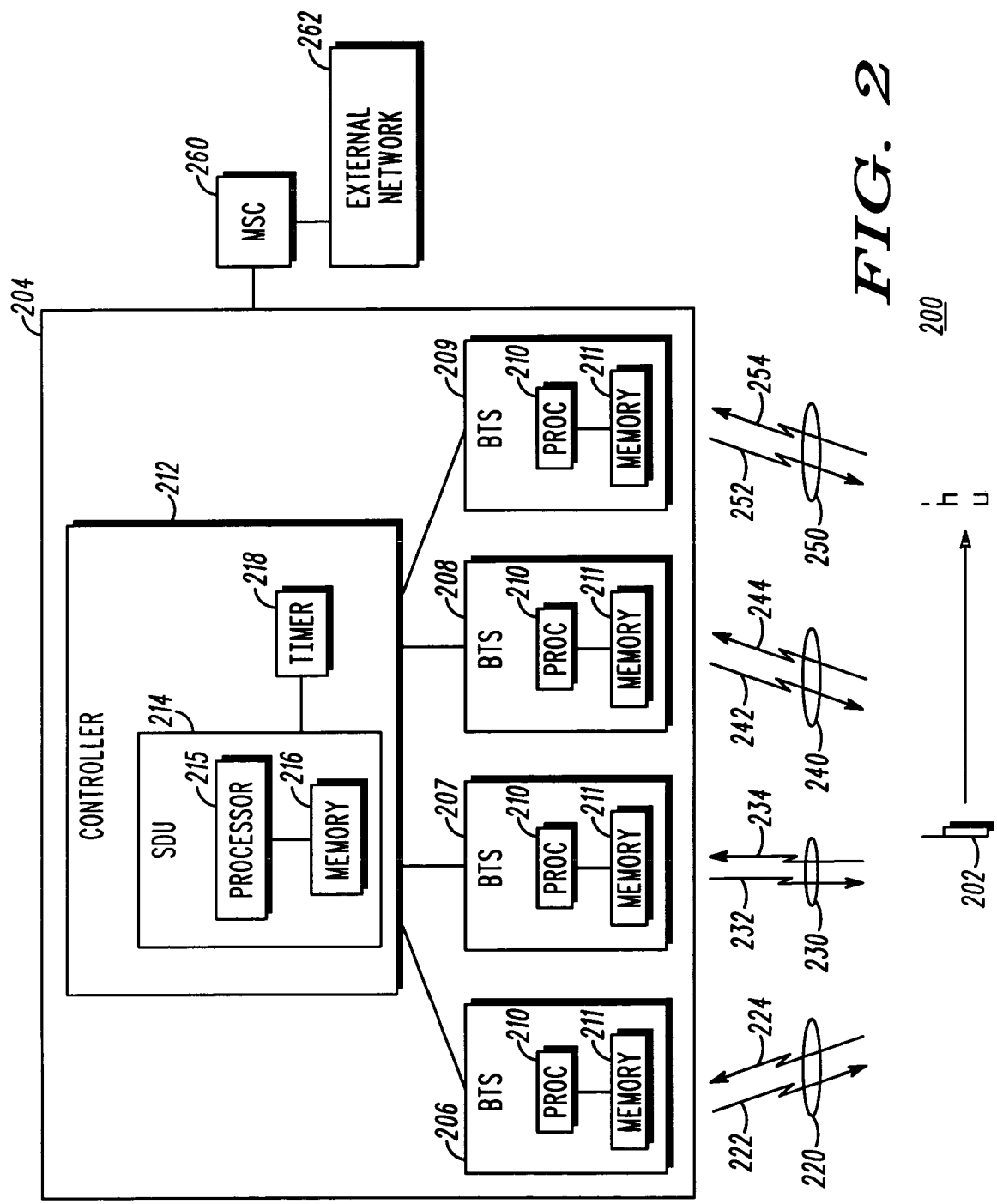
FIG. 2 is a block diagram of a wireless communication system in accordance with an embodiment of the present invention.

The present invention may be more fully described with reference to FIGS. 2–6. FIG. 2 is block diagram of a CDMA wireless communication system 200 in accordance with an embodiment of the present invention. Similar to communication system 100, communication system 200 includes a Base Station Subsystem (BSS) 204 comprising multiple Base Transceiver Stations (BTSs) 206–209 (four shown) that are each coupled to a controller 212, such as a Base Station Controller (BSC) or a Central Base Station Controller (CBSC). BSS 204 is coupled to a mobile switching center (MSC) 260 and MSC 260 is in turn coupled to an external network 262 and provides a communication link between the external network, or other BSSs (not shown), and BSS 204. BSS 204 and MSC 260 may collectively be referred to as an infrastructure of communication system 200.

Each of the multiple BTSs 206–209 and controller 212, preferably a Selection and Distribution Unit (SDU) 214 included in the controller, comprises a respective processor 210, 215 such as one or more microprocessors, microcontrollers, digital signal processors (DSPs), combinations thereof or such other devices known to those having ordinary skill in the art. Each of the multiple BTSs 206–209 and controller 212 further includes a respective one or more memory devices 211, 216 respectively associated with the processor 210, 215, such as random access memory (RAM), dynamic random access memory (DRAM), and/or read only memory (ROM) or equivalents thereof, that store data and programs that may be executed by the processor. Controller 212 may further include a timer 218 that is coupled to SDU 214.

Communication system 200 further includes a mobile station (MS) 202 that is concurrently in active communication with each BTS of multiple BTSs 206–208. That is, MS 202 is in 'soft-handoff' mode with the multiple BTSs 206–208 and each BTS of the multiple BTSs 206–208 is a member of an 'active set' of MS 202. As members of the active set of MS 202, each BTS of the multiple BTSs 206–208 concurrently maintains a respective wireless communication link 220, 230, 240 with the MS. Each communication link 220, 230, 240 includes a respective forward link 222, 232, 242 for conveyance of signals to MS 202 and a respective reverse link 224, 234, 244 for receipt of signals from the MS.

Preferably, communication system 200 is a Code Division Multiple Access (CDMA) communication system, in which each of forward links 222, 232, 242, and 252 and reverse links 224, 234, 244, and 254 comprises multiple communication channels, such as access channels, control channels, paging channels, and traffic channels. Each communication channel of a reverse link 224, 232, 242, 252 or a forward link 224, 234, 244, 254 comprises an orthogonal code, such as a Walsh Code, that may be transmitted in a same frequency bandwidth as the other channels of the link. However, those who are of ordinary skill in the art realize that communication system 200 may operate in accordance with any wireless telecommunication system, such as but not limited to a Global System for Mobile Communications (GSM) communication system, a Time Division Multiple Access (TDMA) communication system, a Frequency Division Multiple Access (FDMA) communication system, or an Orthogonal Frequency Division Multiple Access (OFDM) communication system.

When communication system 200 is operating in a soft-handoff mode, a first plurality of frames transmitted by MS 202 is received by each BTS of the multiple BTSs 206–208 in the active set of the MS via a respective reverse link 224, 234, 244. Each BTS of the multiple BTSs 206–208 then forwards to controller 212 the plurality of frames received by the BTS and further forwards one or more quality indicators that indicates a quality of the received plurality of frames.

The one or more quality indicators forwarded by each BTS 206–208 are based on a reverse link quality metric that may be determined by the BTS on frame-by-frame basis or may be determined with respect to the plurality of frames. For example, the reverse link quality metric may be a frame error rate (FER) that is determined with respect to the plurality of frames, or may be based on a bit error rate (BER), a signal-to-noise ratio (SNR), a signal strength, a carrier-to-interference ratio (CIR), or an $E_b/I_o$ ratio (energy per bit/interference power density (per Hertz)) that is determined with respect to one or more of the plurality of frames. Those who are of ordinary skill in the art realize that many quality metrics are known and may be used herein without departing from the spirit and scope of the present invention.

The quality indicator may then comprise the reverse link quality metric or may be an indicator representative of the reverse link quality metric. For example, a BTS may determine, with respect to each frame and based on the frame quality metric, whether the received frame is acceptable or erroneous. The BTS embeds a quality indicator in a header of the frame, which quality indicator indicates whether the frame is acceptable, that is, good, or erroneous, that is, erased. The BTS then forwards the frame and the embedded quality indicator to controller 212.

When controller 212 receives a plurality of frames and an associated one or more quality indicators from each of the multiple BTSs 206–208, the controller stores the one or more quality indicators in association with the BTS sourcing the plurality of frames and/or the reverse link or communication link via which the plurality of frames are received, in one or more memory devices 216. Upon receiving a same frame from each of the multiple BTSs 206–208, controller 212 then selects a frame from among the same frames received from each of the BTSs and forwards the selected frame to MSC 260. Unless otherwise indicated herein, all functions performed herein by controller 212 are preferably performed by SDU 214, and in particular by processor 215.

As MS 202 moves through communication system 200, the MS may head towards a coverage area, or sector, associated with a BTS not in the MS's active set, such as BTS 209, and away from a coverage area, or sector, associated with a BTS in the active set, such as BTS 206. As MS 202 moves toward BTS 209, a signal strength of a pilot signal received by MS 202 via a forward link 252 associated with BTS 209 increases until MS 202 identifies the pilot signal from BTS 209 as a viable communication link. In addition, as MS 102 heads away from BTS 206, a signal strength of a pilot signal received by MS 202 from BTS 206 via forward link 222 associated with BTS 206 deteriorates to the point that MS 202 determines that communication link 220 is no longer a viable communication link. At that point, communication system 200 determines whether to execute a soft-handoff by adding BTS 209, along with associated communication link 250, to the active set of MS 202 and dropping BTS 206, along with associated communication link 220, from the active set of MS 202.

Figure 3:
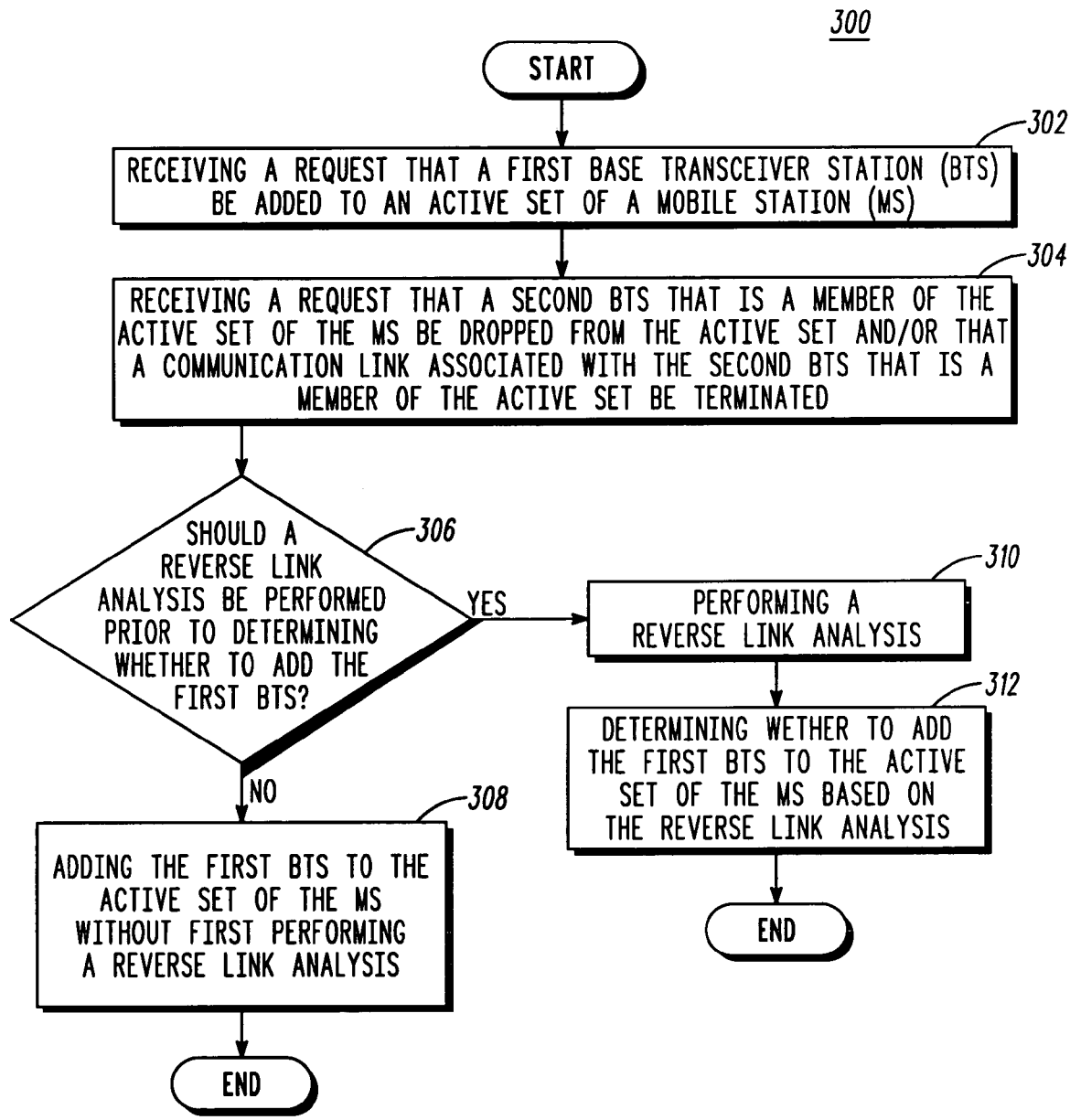
FIG. 3 is a logic flow diagram of a performance of a soft-handoff by the communication system of FIG. 2 in accordance with an embodiment of the present invention.

FIG. 3 is a logic flow diagram 300 of steps executed by communication system 200 in determining whether to execute a soft-handoff in accordance with an embodiment of the present invention. Logic flow diagram 300 begins when MS 202 conveys to the infrastructure of communication system 200, in particular BSS 204, and the infrastructure receives (302) from the MS, a request that the communication system add a first BTS, that is, BTS 209, to the MS's active set and establish a first communication link 250 associated with BTS 209, comprising forward link 252 and a reverse link 254, as an active communication link for transmitting data to, and receiving data from, MS 202. MS 202 further conveys to infrastructure of communication system 200, in particular BSS 204, and the infrastructure receives (304) from the MS, a request that the communication system drop a second BTS, that is, BTS 206, of the multiple BTSs 206–208 in the active set of MS 202 and terminate, or drop, a second communication link associated with the BTS, that is, communication link 220. Preferably, each of the request to add BTS 209 and/or communication link 250 and the request to drop BTS 206 and/or communication link 220 is conveyed by MS 202 by use of a Pilot Strength Measurement Message (PSMM) in which is embedded a request to add or drop the respective BTS and/or communication link.

In order to ensure that the second communication link 220 is not terminated, or dropped, as part of an execution of a soft-handoff and replaced by the first communication link 250 until such time as communication system 200 can confirm that a new reverse link 254 associated with a BTS 209 that may be added to the active set is of acceptable quality, controller 212 determines (306) whether to perform a reverse link analysis prior to adding BTS 209 to the active set of MS 202, that is, whether to evaluate reverse link 254 associated with BTS 209 prior to adding the BTS to the active set of MS 202.

Controller 212 determines whether to perform a reverse link analysis, or evaluation, based on a quality of at least one forward link of the forward links 234, 244 associated with BTSs that are members of the active set of MS 202 and that are not under consideration to be dropped. When controller 212 determines not to perform a reverse link analysis, the controller executes (308) a soft-handoff without first performing a reverse link analysis. That is, controller 212 adds BTS 209, and associated communication link 250, to the active set of MS 202 and drops BTS 206, and associated communication link 220, from the active set of MS 202 without performing a reverse link analysis. By not performing a reverse link analysis, any delay associated with adding needed forward link 254 is minimized.

When, at step 306, controller 212 determines to perform a reverse link analysis prior to performing a soft-handoff, the controller then proceeds to perform (310) a reverse link analysis. The reverse link analysis comprises evaluating at least one of the reverse link associated with the BTS under consideration to be added to the active set of MS 202, that is, reverse link 254 and BTS 209, and the reverse links associated with the BTSs that will remain in the active set of MS 202 after execution of the soft-handoff, that is, reverse links 234 and 244 and BTSs 207 and 208. Based on the reverse link analysis, controller 212 then determines (312) whether to add BTS 209, and associated communication link 250, to the active set of MS 202. Logic flow 300 then ends.

Figure 4:
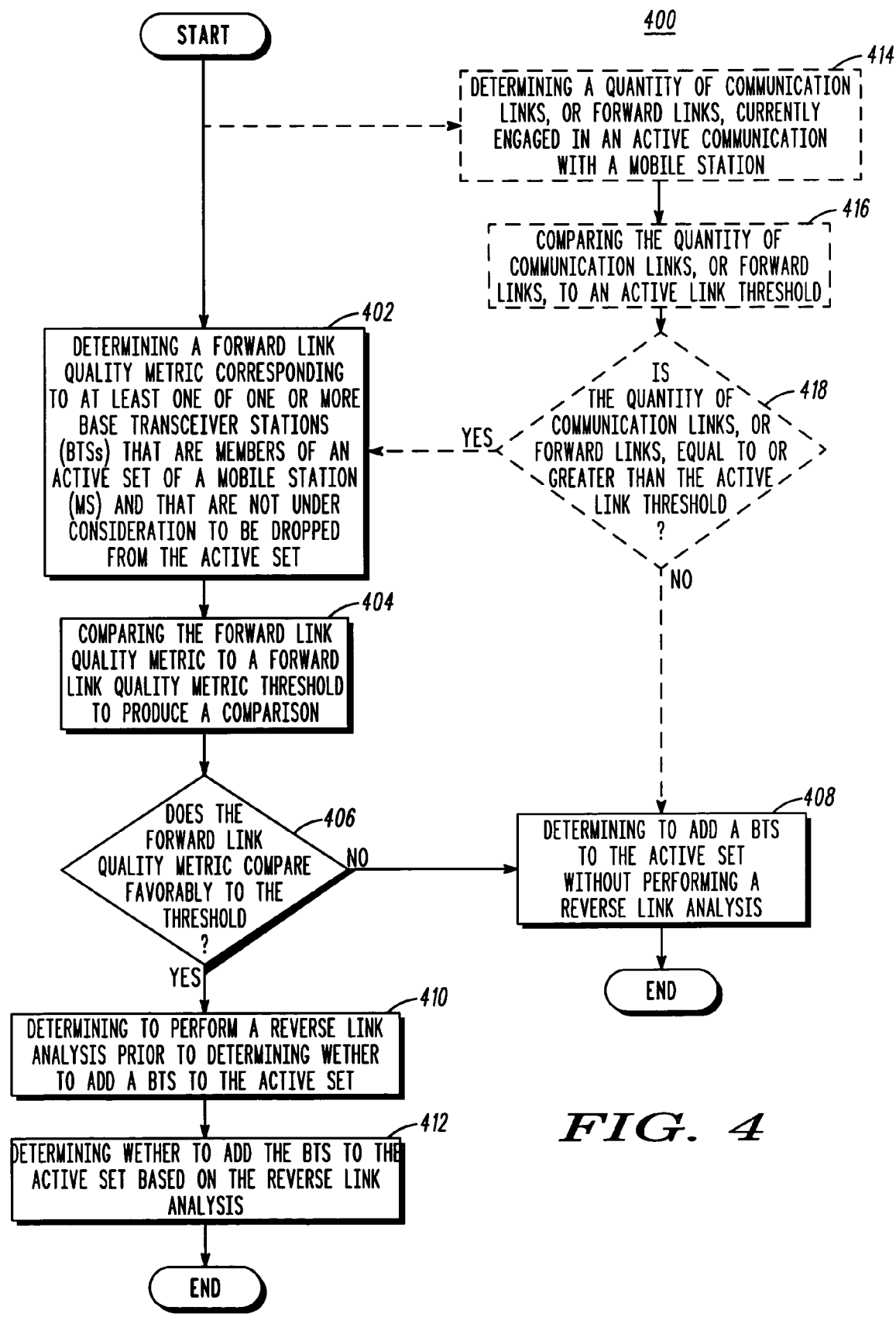
FIG. 4 is a logic flow diagram of a method by which the communication system of FIG. 2 determines whether to perform a reverse link analysis in accordance with various embodiments of the present invention.

Referring now to FIG. 4, a logic flow diagram 400 illustrates a method by which controller 212 determines, in step 306, whether to perform a reverse link analysis in accordance with various embodiments of the present invention. In one embodiment of the present invention, logic flow 400 begins when controller 212 determines (402) a forward link quality metric associated with at least one of a forward link 232, 242 currently in a soft-handoff mode with MS 202 and that will remain in a soft-handoff mode with the MS in the event that BTS 206 and associated communication link 220 are dropped from the active set. Controller 212 then compares (404) the determined forward link quality metric to a forward link quality metric threshold that is stored in the one or more memory devices 216 of controller 212.

In one embodiment of the present invention, the forward link quality metric may be an aggregate metric that is based on forward link quality determinations for all of the forward links 232, 242 currently in a soft-handoff mode with MS 202 and that will remain in a soft-handoff mode with the MS after a possible dropping of link 220 and an adding of link 250. For example, controller 212 may determine aggregate signal strengths for all such forward links 232, 242. Controller 212 then compares the determined forward link quality metric to an aggregate forward link quality metric threshold.

In another embodiment of the present invention, controller 212 may determine a forward link quality metric by determining a quality of each forward link 232, 242 currently in a soft-handoff mode with MS 202 and that will remain in a soft-handoff mode with the MS after a possible dropping of link 220 and an adding of link 250, and further determining a best forward link quality from among the multiple determined forward link qualities. Controller 212 then compares the forward link quality metric, that is, the best forward link quality, to a forward link quality metric threshold.

Forward link quality metrics are well-known in the art. For example, the forward link quality metric may be a frame error rate (FER) that is determined with respect to the plurality of frames, or may be based on a bit error rate (BER), a signal-to-noise ratio (SNR), a signal strength, a carrier-to-interference ratio (CIR), or an $E_b/I_o$ ratio (energy per bit/interference power density (per Hertz)) that is determined with respect to one or more of the plurality of frames. Those who are of ordinary skill in the art realize that many quality metrics are known and may be used herein without departing from the spirit and scope of the present invention.

In one embodiment of the present invention, MS 202 may determine a forward link quality metric with respect to signals received via a forward link 232, 242, and convey the forward link metric to BSS 204, and in particular controller 212, via any one or more of the BTSs in the active set of the MS. Controller 212 may then determine a forward link quality metric based on the forward link quality metric received from MS 202. In another embodiment of the present invention, the MS may make measurements in regard to a signals received by the MS via a forward link 232, 242, and convey the measurements to BSS 204, and in particular controller 212, via any one or more of the BTSs in the active set of the MS. Controller 212 may then determine a forward link quality metric based on the measurements received from MS 202

When the forward link quality metric compares unfavorably with the forward link quality metric threshold, for example, when the forward link quality metric is less than the threshold, then the forward links 232, 242 currently in a soft-handoff mode with MS 202 and that will remain in a soft-handoff mode with the MS may be considered to be weak and a new forward link is needed for the active set. As a result, when controller 212 determines (406) that the forward link quality metric compares unfavorably with the threshold, controller 212 further determines (408) to execute a soft-handoff without performing a reverse link analysis. That is, controller 212 adds BTS 209, and associated communication link 250, to the active set of MS 202 without performing a reverse link analysis. By not performing a reverse link analysis, any delay associated with adding needed forward link 254 is minimized. Logic flow 400 then ends.

When the forward link quality metric compares favorably with the forward link quality metric threshold, then at least one of the forward links 232, 242 currently in soft-handoff with MS 202 and that will remain in soft-handoff with the MS may be considered to be acceptable. As a result, MS 202 may be considered to be capable of maintaining an acceptable level of communication with the infrastructure of communication system 200 without adding a new forward link, that is, forward link 252. Accordingly, a new forward link is not urgently needed and communication system 200 may tolerate a delay associated with performing a reverse link analysis prior to adding the new forward link, that is, forward link 252. As a result, when controller 212 determines (406) that the forward link quality metric compares favorably with the forward link quality metric threshold, controller 212 further determines (410) to perform a reverse link analysis prior to determining whether to add BTS 209, and associated communication link 250, to the active set of MS 202. Controller 212 then determines (412) whether to add BTS 209, and associated communication link 250, to the active set of MS 202 based on the reverse link analysis. Logic flow 400 then ends.

In another embodiment of the present invention, the method by which controller 212 determines, in step 306, whether to perform a reverse link analysis may further include the following steps. Prior to determining a forward link quality metric in step 402, controller 212 may determine (414) a quantity of communication links, or forward links, currently in soft-handoff mode with MS 202, that is, currently engaged in an active communication with MS 202. Controller 212 then compares (416) the quantity of communication links, or forward links, to an active link threshold. The active link threshold corresponds to, at the least, a minimum quantity of communication links desirable for maintaining an acceptable soft-handoff mode of operation between MS 202 and the infrastructure of communication system 200.

When controller 212 determines (418) that the quantity of communication links, or forward links, is less than the active link threshold, then logic flow diagram 400 proceeds to step 408. That is, when the quantity of communication links, or forward links, is less than the active link threshold, the addition of new communication link 250, or forward link 252, to the links in active communication with MS 202 is desirable regardless of reverse link quality. Controller 212 then determines (408) to add the new BTS 209, and the associated communication link 250, to the active set of MS 202 without performing a reverse link analysis.

When controller 212 determines (418) that the quantity of communication links, or forward links, is equal to or greater than the active link threshold, then logic flow diagram 400 proceeds to step 402. That is, when the quantity of communication links, or forward links, is equal to or greater than the active link threshold, the addition of new communication link 250, or forward link 252, to the links in active communication with MS 202 may be desirable but is of a lesser importance. Controller 212 then performs a forward link analysis, that is, steps 402, 404, and 406, in order to determine whether to perform a reverse link analysis prior to adding the new BTS 209, and the associated communication link 250, to the active set of MS 202.

Figure 5:
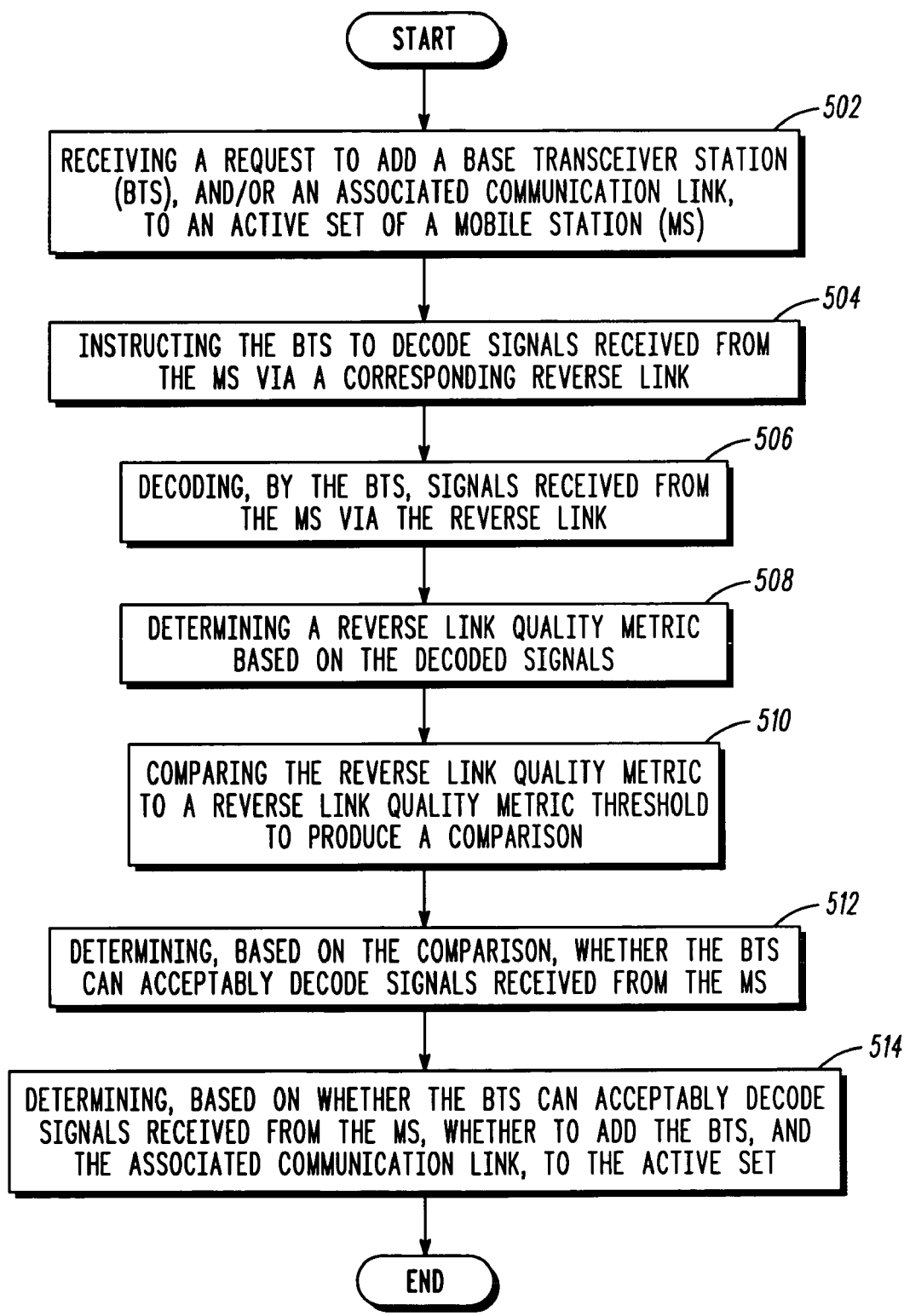
FIG. 5 is a logic flow diagram of a method by which the communication system of FIG. 2 performs a reverse link analysis in accordance with an embodiment of the present invention.

Referring now to FIG. 5, a logic flow diagram 500 is illustrated depicting a method by which controller 212 performs a reverse link analysis in accordance with an embodiment of the present invention. Logic flow diagram 500 begins when communication system 200, and in particular controller 212, receives (502), from MS 202, a request that the communication system add BTS 209 to the active set and/or add communication link 250. Controller 212 then instructs (504) BTS 209 to decode the reverse link between the BTS and MS 202, that is, reverse link 254. In response to the instruction, BTS 209, in particular processor 210 of the BTS, decodes (506) signals received from MS 202 via reverse link 254. Based on the decoded signals, BTS 209, and in particular processor 210, determines (508) a reverse link quality metric with respect to the decoded signals. BTS 209, and in particular processor 210, then compares (510) the reverse link quality metric determined with respect to reverse link 254 to a reverse link quality metric threshold that is stored in the one or more memory devices 211 of the BTS. Based on the comparison, BTS 209, and in particular processor 210, then determines (512) whether the BTS can acceptably decode signals received from MS 202 and so informs controller 212. Based on whether BTS 209 can acceptably decode signals received from MS 202, controller 212 then determines (514) whether to add BTS 209 to the active set of MS 202. Logic flow 500 then ends.

In another embodiment of the present invention, one or more of steps 508, 510, 512 of logic flow diagram 500 may be distributed among BTS 209 and controller 212. For example, BTS 209 may make a measurement with respect to a quality of reverse link 254, that is, with respect to signals received via the reverse link, and forward the measurement to controller 212. The measurement may comprise a reverse link quality metric, or controller 212 may determine a reverse link quality metric with respect to reverse link 254 based on the received measurement. Controller 212 may then compare the reverse link quality metric determined with respect to reverse link 254 to a reverse link quality metric threshold that is stored in the one or more memory devices 216 of controller 212 to produce a comparison. Based on the comparison, controller 212 may determine whether BTS 209 can acceptably decode signals received from MS 202 and, based on whether the BTS can acceptably decode signals received from MS 202, whether to add BTS 209 to the active set of MS 202.

For example, BTS 209 or controller 212 may determine the reverse link quality metric based on one or more quality indicators stored with respect to a predetermined number of frames received via reverse link 254, such as 120 frames, or stored with respect to frames received via the reverse link during a predetermined time period. The predetermined number of frames or the predetermined time period may be maintained in the one or more memory devices 211 of the BTS or the one or more memory devices 216 of controller 212, whichever is appropriate. When the stored one or more quality indicators comprises an indication of whether a frame is a good frame or an erased frame, step 508 may comprise determining, by BTS 209 or controller 212, the reverse link quality metric by determining a quantity of frames based on the stored quality indicators, such as a quantity of erased frames or a quantity of good frames received via reverse link 224. Step 510 may then comprise comparing, by BTS 209 or controller 212, the determined quantity of frames to a threshold that is stored in the one or more memory devices 216 to produce the first comparison.

Step 512 may then comprise the following steps. Based on the comparison, when the quantity of frames compares unfavorably with the threshold, BTS 209 or controller 212 may determine that reverse link 254 is not a good link. Controller 212 may then determine not to add BTS 209 and communication link 250. However, when the quantity of frames compares favorably with the threshold, BTS 209 or controller 212 may determine that reverse link 254 is an acceptable, or good, link. Controller 212 may then determine to add BTS 209, and associated communication link 250, to the active set of MS 202.

For example, when BTS 209 or controller 212 determines, in step 508, a quantity of erased frames received via reverse link 254 and further determines, in step 510, that the determined quantity of erased frames exceeds an erased frame threshold, BTS 209 or controller 212 may determine that reverse link 254 is not a good link. However, if the determined quantity of erased frames does not exceed the erased frame threshold, then BTS 209 or controller 212 may determine that reverse link 254 is good link. By way of another example, when BTS 209 or controller 212 determines, in step 508, a quantity of good frames received via reverse link 254 and further determines, in step 510, that the determined quantity of good frames exceeds a good frame threshold, BTS 209 or controller 212 may determine that reverse link 254 is a good link. However, if the determined quantity of good frames does not exceed the good frame threshold, then BTS 209 or controller 212 may determine that reverse link 254 is not a good link.

Figure 6:
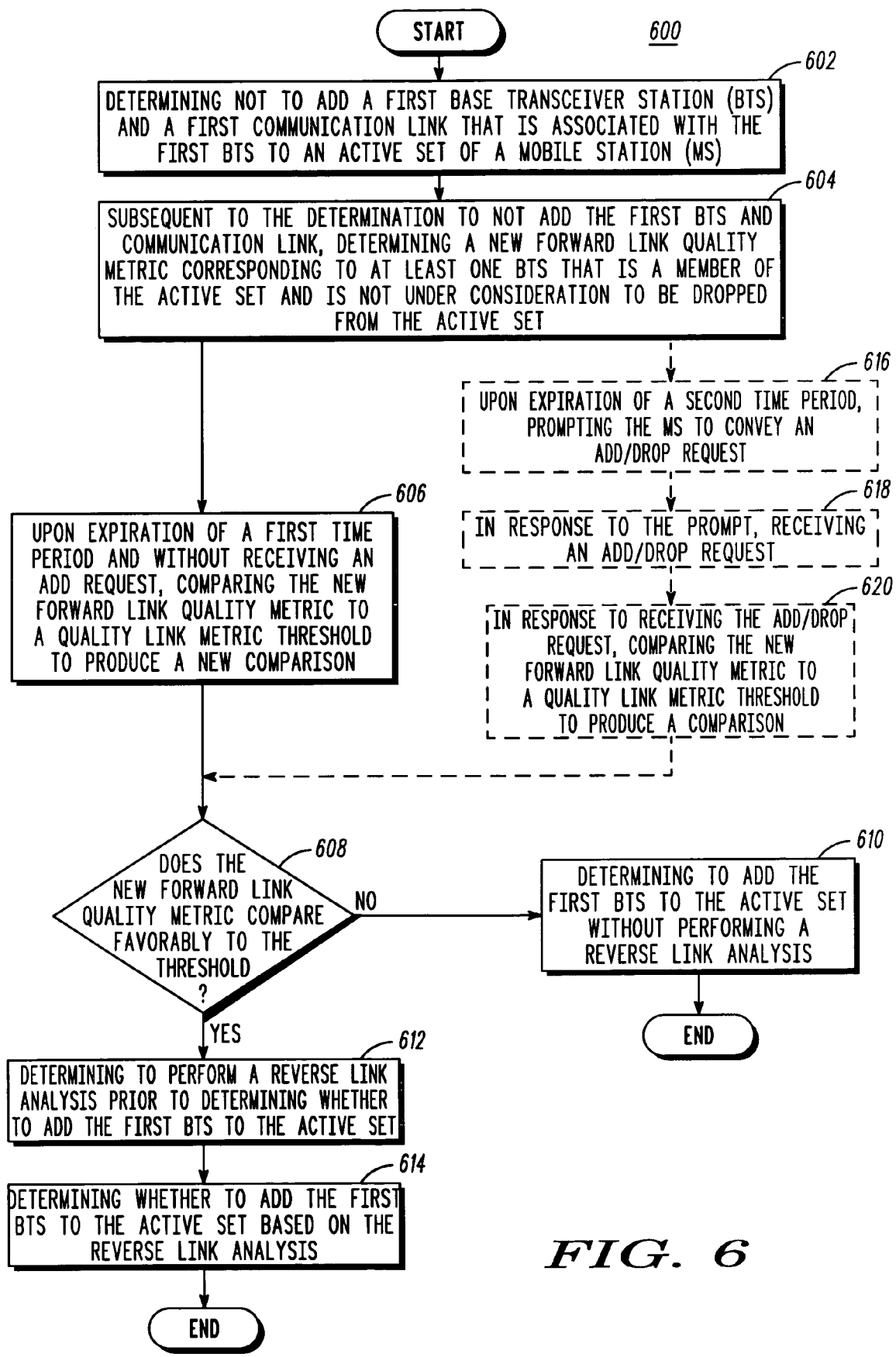
FIG. 6 is a logic flow diagram of a performance of a soft-handoff by the communication system of FIG. 2 in accordance with another embodiment of the present invention.

When communication system 200 determines, at step 514, not to add a new BTS, that is, BTS 209, and an associated communication link, that is communication link 250, to the active set of MS 202, BTS 209 and/or controller 212 may continue consideration of BTS 209 and associated communication link 250 and as add candidates and initiate another add determination. FIG. 6 is a logic flow diagram 600 of steps performed by communication system 200 in making a subsequent determination of whether add BTS 209, and associated communication link 250, to an active set of MS 202 after initially determining not to add the BTS and communication link in accordance with various embodiments of the present invention. Logic flow diagram 600 begins when controller 212 determines (602) to not add BTS 209 and/or the associated communication link, that is, communication link 250 to the active set of MS 202. Subsequent to the determination to not add the BTS and/or communication link, controller 212 determines (604) a forward link quality metric associated with at least one of a forward link 232, 242 currently in soft-handoff with MS 202 and that will remain in soft-handoff with the MS in the event that BTS 206 and associated communication link 220 may be dropped from the active set, and a forward link 252 associated with the BTS 209 associated communication link 250 being considered to be added to the active set. Upon expiration of a first time period that is determined by controller 212 with reference to timer 218, controller 212 compares (606) the determined forward link quality metric to the forward link quality metric threshold that is stored in the one or more memory devices 216 of controller 212.

When controller 212 determines (608) that the forward link quality metric compares unfavorably with the threshold, controller 212 further determines (610) to execute a soft-handoff without performing a reverse link analysis. That is, controller 212 adds BTS 209, and associated communication link 250, to the active set of MS 202 without performing a reverse link analysis. When controller 212 determines (608) that the forward link quality metric compares favorably with the forward link quality metric threshold, controller 212 further determines (612) to perform a reverse link analysis prior to determining whether to add BTS 209, and associated communication link 250, to the active set of MS 202. Controller 212 then determines (614) whether to add BTS 209, and associated communication link 250, to the active set of MS 202 based on the reverse link analysis. Logic flow diagram 600 then ends.

In another embodiment of the present invention as depicted in FIG. 6, wherein controller 212 continues consideration of BTS 209 and communication link 250 as add candidates after a determination not to add, instead of making a subsequent determination of whether to add BST 209 and communication link 250 without receiving a subsequent drop/add request, controller 212 may prompt (616) MS 202 to convey a drop/add request upon expiration of a second time period. The second time period is determined by controller 212 with reference to timer 218 and may or may not be the same as the first time period. The drop/add request indicates a desire of the MS to either add or not add BTS 209 and communication link 250 to the active set of MS 202. Preferably, controller 212 prompts MS 202 for the drop/add request by conveying a Pilot Measurement Request Order (PMRO) to the MS.

In response to receiving the prompt, MS 202 conveys to controller 212, and controller 212 receives (618) from the MS, a drop/add request that indicates a desire to either add or not add BTS 209 and communication link 250 to the active set of MS 202. Preferably, the drop/add request comprises a PSMM message in which the MS embeds an indication of whether to add or not add the BTS and communication link. When the drop/add request indicates a desire to add BTS 209 and communication link 250, controller 212 compares (620) the determined forward link quality metric to the forward link quality metric threshold that is stored in the one or more memory devices 216 of controller 212 and logic flow diagram 600 proceeds to step 608.

In summarizing, in order to ensure that, during a soft-handoff, that a BTS 209 with an acceptable quality reverse link 254 is being added to an active set of MS 202 before dropping a communication link 220, communication system 200 may perform an analysis of the reverse link 254 being added. However, before performing the reverse link analysis, communication system 200 first determines that the communication system can tolerate any delay associated with performing the reverse link analysis, or that a reverse link analysis is desired, by performing a forward link analysis. When communication system 200 determines that communication system cannot tolerate any delay associated with performing the reverse link analysis and/or that a reverse link analysis is not desired, the communication system adds BTS 209 and associated communication links 250 and 254 without performing a reverse link analysis. When communication system 200 determines that the communication system can tolerate a delay associated with performing the reverse link analysis and/or that a reverse link analysis is desired, the communication system performs an analysis of reverse link 254 and, based on the reverse link analysis, determines whether to add BTS 209, and the communication links associated with the BTS, to the active set of MS 202. Upon determining to not add BTS 209 to the active set, communication system 200 may further monitor the forward links associated with MS 202 to determine whether to re-consider adding BTS 209, and the communication links associated with the BTS, to the active set.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. It is further understood that the use of relational terms, if any, such as first and second, top and bottom, and the like are used solely to distinguish one entity or action from another entity or action without necessarily requiring or implying any actual such relationship or order between such entities or actions.

What is claimed is:

1. A method for performing a soft-handoff in a wireless communication system comprising:
   receiving a request to add a base station to an active set of a mobile station;
   determining whether to analyze a reverse link;
   in response to determining not to analyze the reverse link, adding the base station to the active set without evaluating the reverse link;
   in response to determining to analyze the reverse link, evaluating the reverse link;
   in response to evaluating the reverse link, determining whether to add the base station to the active set based upon the evaluation; and
   wherein determining whether to analyze a reverse link comprises:
      determining a forward link quality metric corresponding to a forward link of at least one base station that is a member of the active set and that is not under consideration to be dropped from the active set;
      comparing the forward link quality metric to a forward link quality metric threshold to produce a comparison; and
      determining whether to analyze a reverse link associated with at least one of the base station under consideration to be added to the active set and a base station that is a member of the active set of the mobile station based on the comparison.

2. The method of claim 1, wherein determining whether to analyze a reverse link based on the comparison further comprises:
when the forward link quality metric compares favorably with the forward link quality metric threshold, determining to analyze a reverse link associated with at least one of the base station under consideration to be added to the active set and a base station that is a member of the active set of the mobile station; and
when the forward link quality metric compares unfavorably with the forward link quality metric threshold, determining not to analyze the reverse link.

3. The method of claim 1, wherein evaluating the reverse link comprises:
determining a reverse link quality metric corresponding to the reverse link, wherein the reverse link is associated with the base station;
comparing the reverse link quality metric to a threshold to produce a comparison; and
wherein determining whether to add the base station to the active set base upon the evaluation comprises determining whether to add the base station to the active set based on the comparison.

4. The method of claim 3, wherein the first reverse link quality metric comprises a quality of frames, wherein comparing the reverse link quality metric to the threshold comprises comparing the quality of frames to a quality threshold to produce a comparison.

5. A method for performing a soft-handoff in a wireless communication system comprising:
receiving a request to add a base station to an active set of a mobile station;
determining whether to analyze a reverse link;
in response to determining not to analyze the reverse link, adding the base station to the active set without evaluating the reverse link;
in response to determining to analyze the reverse link, evaluating the reverse link;
in response to evaluating the reverse link, determining whether to add the base station to the active set based upon the evaluation; and
wherein determining whether to analyze a reverse link comprises:
determining a quantity of communication links currently engaged in an active communication with the mobile station;
comparing the quantity of communication links an active link threshold; and
when the quantity of communication links is less than the active link threshold, determining not to analyze the reverse link.

6. The method of claim 5, wherein evaluating the reverse link comprises:
determining a reverse link quality metric corresponding to the reverse link;
comparing the reverse link quality metric to a threshold to produce a comparison; and
wherein determining whether to add the base station to the active set base upon the evaluation comprises determining whether to add the base station to the active set based on the comparison.

7. A method for performing a soft-handoff in a wireless communication system comprising:
receiving a request to add a base station to an active set of a mobile station;
determining whether to analyze a reverse link;
in response to determining not to analyze the reverse link, adding the base station to the active set without evaluating the reverse link;
in response to determining to analyze the reverse link, evaluating the reverse link;
in response to evaluating the reverse link, determining whether to add the base station to the active set based upon the evaluation; and
wherein determining whether to analyze a reverse link comprises:
determining a quantity of communication links currently engaged in an active communication with the mobile station;
comparing the quantity of communication links to active link threshold;
when the quantity of communication links is equal to or greater than the active link threshold:
determining a forward link quality metric corresponding to a forward link of at least one base station that is a member of the active set and that is not under consideration to be dropped from the active set;
comparing the forward link quality metric to a forward link quality metric threshold to produce a comparison; and
determining whether to analyze a reverse link associated with at least one of the base station under consideration to be added to the active set and a base station that is a member of the active set of the mobile station based on the comparison.

8. The method of claim 7, wherein evaluating the reverse link comprises:
determining a reverse link quality metric corresponding to the reverse link;
comparing the reverse link quality metric to a threshold to produce a comparison; and
wherein determining whether to add the base station to the active set base upon the evaluation comprises determining whether to add the bas station to the active set based on the comparison.

9. A method for performing a soft-handoff in a wireless communication system comprising:
receiving a request to add a base station to an active set of a mobile station;
determining whether to analyze a reverse link;
in response to determining not to analyze the reverse link, adding the base station to the active set without evaluating the reverse link;
in response to determining to analyze the reverse link, evaluating the reverse link;
in response to evaluating the reverse link, determining whether to add the base station to the active set based upon the evaluation; and
in response to determining not to add the first base station to the active set;
determining a new forward link metric corresponding to a forward link of at least one base station that is a member of the active set and that is not under consideration to be dropped from the active set;
upon expiration of a first time period and without receiving an add request, comparing the new forward link quality metric to a forward link quality metric threshold to produce a new comparison; and
determining whether to analyze a reverse link associated with at least one of the base station under consideration to be add to the active set and a base station that is a member of the active set of the mobile station based on the new comparison.

10. The method of claim 9, wherein evaluating the reverse link comprises:
   determining a reverse link quality metric corresponding to the reverse link;
   comparing the reverse link quality metric to a threshold to produce a comparison; and
   wherein determining whether to add the base station to the active set base upon the evaluation comprises determining whether to add the base station to the active set based on the comparison.

11. A method for performing a soft-handoff in a wireless communication system comprising:
   receiving a request to add a base station to an active set of a mobile station;
   determining whether to analyze a reverse link;
   in response to determining not to analyze the reverse link, adding the base station to the active set without evaluating reverse link;
   in response to determining to analyze the reverse link, evaluating the reverse link;
   in response to evaluating the reverse link, determining whether to add the base station to the active set based upon the evaluation; and
   in response to determining not to add the first base station to the active set:
      determining a new forward link metric corresponding to a forward link of at least one base station that is a member of the active set and that is not under consideration to be dropped from the active set;
      upon expiration of a second time period, prompting the mobile station for a new request to add the base station to the active set;
      in response to the prompt, receiving a new add request;
      in response to receiving the new add request, comparing the new forward link quality metric to a forward link quality metric threshold to produce a new comparison; and
      determining whether to analyze a reverse link associated with at least one of the base station under consideration to be added to the active set and a base station that is a member of the active set of the mobile station based on the new comparison.

12. An apparatus for performing a soft-handoff in a wireless infrastructure comprising:
   a processor that determines whether to analyze a reverse link, in response to determining not to analyze the reverse link, adds a base station to an active set of a mobile station without evaluating the reverse link, in response to determining to analyze the reverse link, evaluates the reverse link, and in response to evaluating the reverse link, determines whether to add the based station to the active set base upon the evaluation;
   at least one memory device coupled to the processor that maintains a forward link quality metric threshold; and
   wherein the processor determines whether to analyze a reverse link by determining a forward link quality metric corresponding to a forward link of at least one base station that is a member of the active set and that is not under consideration to be dropped from the active set, comparing the forward link quality metric to the forward link quality metric threshold to produce a comparison, and determining whether to analyze a reverse link associated with at least one of the base station under consideration to be added to the active set and a base station that is a member of the active set based on the comparison.

13. The apparatus of claim 12, wherein the processor determines whether to analyze a reverse link based on the comparison by further determining, when the forward link quality metric compares favorably with the forward link quality metric threshold, to analyze a reverse link associated with at least one of the base station under consideration to be added to the active set and a base station that is a member of the active set and determining, when the forward link quality metric compares unfavorably with the forward link quality metric threshold, not to analyze the reverse link.

14. The apparatus of claim 12, wherein the processor evaluates the reverse link by determining a reverse link quality metric corresponding to the reverse link, wherein the reverse link is associated with base station under consideration to be added to the active set, compares the reverse link quality metric to a threshold to produce a comparison, and wherein the processor determines whether to add the base station to the active set base upon the evaluation.

15. The apparatus of claim 14, wherein the reverse link quality metric comprises a quantity of frames and wherein comparing the reverse link quality metric to the threshold comprises comparing the quantity of frames to the threshold.

16. The apparatus of claim 12, where the apparatus is at least one of a Base Transceiver Station, a Base Station Controller, a Central Base Station Controller, and a Selection and Distribution Unit.

17. An apparatus for performing a soft-handoff in a wireless infrastructure comprising:
   a processor that determines whether to analyze a reverse link, in response to determining not to analyze the reverse link, adds a base station to an active set of a mobile station without evaluating the reverse link, in response to determining to analyze the reverse link, evaluates the reverse link, and in response to evaluating the reverse link, determines whether to add the base station to the active set based upon the evaluation;
   at least one memory device coupled to the processor that maintains an active link threshold; and
   wherein the processor determines whether to analyze a reverse link by determining a quantity of communication links currently engaged in an active communication with the mobile station, comparing the quantity of communication links to an active link threshold and, when the quantity of communication links is less than the active link threshold, determining not to analyze the reverse link.

18. An apparatus for performing a soft-handoff in a wireless infrastructure comprising:
   a processor that determines whether to analyze a reverse link, in response to determining not to analyze the reverse link, adds a base station to an active set of a mobile station without evaluating the reverse link, in response to determining to analyze the reverse link, evaluates the reverse link, and in response to evaluating the reverse link, determines whether to add the base station to the active set based upon the evaluation;
   at least one memory device coupled to the processor that maintains an active link threshold; and
   wherein the processor determines whether to analyze a reverse link by determining a quantity of communication links currently engaged in an active communication with the mobile station, comparing the quantity of communication links to an active link threshold and, when the quantity of communication links is equal to or greater than the active link threshold, determining a forward link quality metric corresponding to a forward link of at least one base station that is a member of the active set and that is not under consideration to be dropped from the active set, comparing the forward link quality metric to a forward link quality metric threshold to produce a comparison, and determining whether to analyze a reverse link associated wit at least one of the base station under consideration to be added to the active set and a base station that is a member of the active set of the mobile station based on the comparison.

19. An apparatus for performing a soft-handoff in a wireless infrastructure comprising a processor that determines whether to analyze a reverse link, in response to determining not to analyze the reverse link, adds a base station to an active set of the mobile station without evaluating the reverse link, in response to determining to analyze the reverse link, evaluates the reverse link, in response to evaluating the reverse link, determines whether to add the base station to the active set based upon the evaluation in response to determining not to add the base station to the active set, determines a new forward link metric corresponding to a forward link of at least one base station that is a member of the active set and that is not under consideration to be dropped from the active set and, in response to expiration of a first time period and without receiving an add request, compares the new forward link quality metric to a forward link quality metric threshold to produce a new comparisons and determines whether to analyze a reverse link associated with at least one of the base station under consideration to the added to the active set and a base station that is a member of the active set of mobile station based on the new comparison.

20. An apparatus for performing a soft-handoff in a wireless infrastructure comprising a processor that determines whether to analyze a reverse link, in response to determining not to analyze the reverse link, adds a base station to the active set without evaluating the reverse link, in response to determining to analyze the reverse link, evaluates the reverse link, in response to evaluating the reverse link, determines whether to add the base station to the active set based upon the evaluation, in response to determining not to add the base station to the active set, determines a new forward metric corresponding to a forward link of at least one base station that is a member of the active set and that is not under consideration to be dropped from the active set and, in response to expiration of a second time period, prompts the mobile station for a new request to add the base station to the active set, receives a new add request in response the prompt, in response to receiving the new add request, compares the new forward link quality metric to a forward link quality metric threshold to produce a new comparison, and determines whether to analyze a reverse link associated with at least one of the base station under consideration to be added to the active set and a base station that is a member of the active set of the mobile station based on the new comparison.

* * * * *